March 25, 1930.  H. W. NIEMAN  1,751,645
SERVO MECHANISM
Original Filed Jan. 28, 1925

INVENTOR
Henry W. Nieman.
BY R. S. A. Dougherty
and A. B. Reavis
ATTORNEYS

Patented Mar. 25, 1930

1,751,645

UNITED STATES PATENT OFFICE

HENRY W. NIEMAN, OF BETHLEHEM, PENNSYLVANIA, ASSIGNOR TO BETHLEHEM STEEL COMPANY

SERVO MECHANISM

Application filed January 28, 1925, Serial No. 5,327. Renewed December 26, 1929.

This invention relates to servo motors and particularly to mechanical servo mechanisms of the follow up type.

An object of this invention is to provide a device to transmit power in either direction, as desired, and at the expenditure of very little force on the part of the operator member.

Another object of this invention is to provide a mechanism wherein a continuously operating operator member may be adapted to drive a drive member in either direction or hold it stationary, controlled by the operation of a single device and at the expenditure of very little force on the part of said device.

Another object of this invention is to provide a clutch mechanism which may be operated by a single device to transmit a driving force in either direction in conformity with the direction of movement of the operator member.

Another object of this invention is to provide a clutch means for connecting and disconnecting a normally stationary shaft with a revolving shaft, which shall in the main be operated by the power of the revolving shaft itself to cause the rotation of the normally stationary shaft in either direction as desired, said means being controlled by a single device which may be manipulated at the expenditure of very little force on the part of the operator member, and at the same time secure a powerful driving connection.

Another object of this invention is to provide a mechanical servo mechanism adapted to transmit a motion performed by an operator member and including means whereby a considerable torque is obtained at the expenditure of very little torque applied to the operator member.

Another object of this invention is to provide a mechanical servo mechanism adapted to follow up the motions performed by an operator member and including means to transmit and greatly increase the torque exerted by the operator member.

The present invention comprises generally a continuously operating power shaft geared to a pair of drum members revolubly mounted on the drive shaft which is to be driven by the power shaft. The drum members are adapted to be rotated continuously but in opposite directions. One of the drums engages said drive shaft by means of a friction device under constant load, whereas the second drum is adapted to engage said drive shaft by means of a friction device which is normally under a load substantially equal to the load imposed upon the first mentioned friction device but which will be increased or decreased by any relative displacement of an operator member and the drive shaft. Under normal conditions, that is, when the drive shaft is maintained stationary, the drums rotate in opposite directions at a uniform speed and both friction devices are in equilibrium. Thus the drive shaft is held firmly against movement, the slippage being provided between the contiguous surfaces of the friction devices. An operating device is provided to vary the load on the second mentioned friction device so as to determine the direction of rotation of the drive shaft; in other words, when the load on the latter friction device is increased, the drive shaft is driven in the same direction as the drum associated with said device, and when such load is relieved so that the holding power is less than that of the first mentioned friction device, then the drive shaft rotates in the opposite direction, that is, in the same direction as the drum associated with the first mentioned friction device. When the loads maintained on the friction devices balance the drive shaft remains stationary.

The novel features will be more fully understood from the following description and claims, taken with the drawings, in which:

Figure 1:
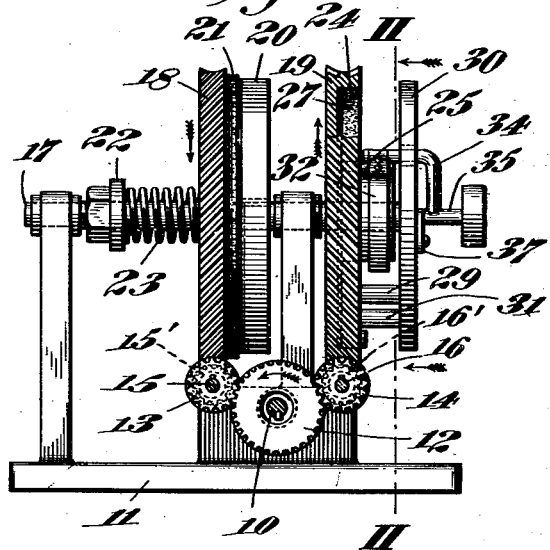
Fig. 1 is a side elevation partly broken away, and illustrating an embodiment of the invention.

Referring to the drawings, 10 indicates a power shaft which is journalled in bearings attached to the frame 11 and is adapted to be driven continuously in one direction by any suitable prime mover. Keyed to shaft 10 is a gear wheel 12 which meshes with pinions 13 and 14 which are keyed to worm shafts 15 and 16, respectively. A cross shaft 17 is journalled in bearings attached to the frame 11 and constitutes the drive shaft of the device. Revolubly mounted on shaft 17 are drums 18 and 19 having worm threads formed on the periphery, adapted to engage the worms 15' and 16' of the worm shafts 15 and 16, respectively. The worm on shaft 15 is left hand whereas the worm on the shaft 16 is right hand, so that upon the rotation of the shaft 10 the drums rotate in opposite directions as indicated by arrows on the drawing. Keyed to the shaft 17 is an annular plate 20 and interposed between the latter and drum 18 in an annular disc 21 made of material having a high coefficient of friction, such as cork. A tensioning device is provided to maintain a constant surface pressure between the contiguous faces of the drum, the plate and the disc. Said tensioning device comprises an adjustable collar 22 threaded to the shaft 17 and a coil spring 23 surrounding the latter and interposed between said collar and the drum 18. By adjusting the collar 22 along the shaft a predetermined pressure on the disc 21 may be maintained. The drum 19 is recessed as at 24 and integral with the drum 19 is a cylindrical boss 25. An internal clutch band 26 is mounted within the recess 24, and interposed between the circumferential surface of said recess and the band is a strip 27. The strip 27 is preferably made of cork, but it is understood that any suitable material may be used having a high coefficient of friction. One end of the band 26 is pivoted to the end of the lever 28 which is rotatably mounted on the pin 29 projecting laterally from the face of the plate 30 which is an integral part of the shaft 17. The other end of the band 26 is pivoted to a second laterally projecting pin 31 fixed to the plate 30. An external clutch band 32 of lighter cross section than the cross section of the internal band 26, surrounds the boss 25 and a cork strip 33 is interposed between said band and the cylindrical surface of the boss 25. One end of the band 32 is pivoted to an arm of a lever 28 and the other end is mounted on the lateral projection 34 extending from the actuator member 35 through an elongated opening formed in the plate 30. The member 35 is journalled in the axial opening 36 formed in the shaft 17 and may rotate freely therein, although axial relative movement is prevented by means of the plate 37 engaging the groove 38.

Figure 2:
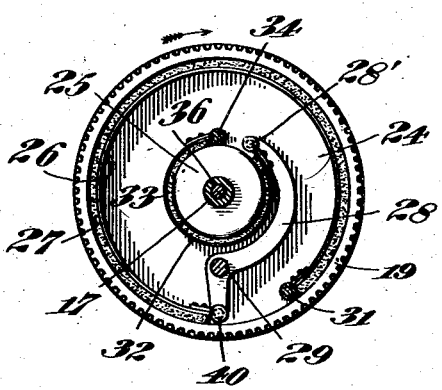
Fig. 2 is a cross section taken on line II—II of Fig. 1.
Figure 3:
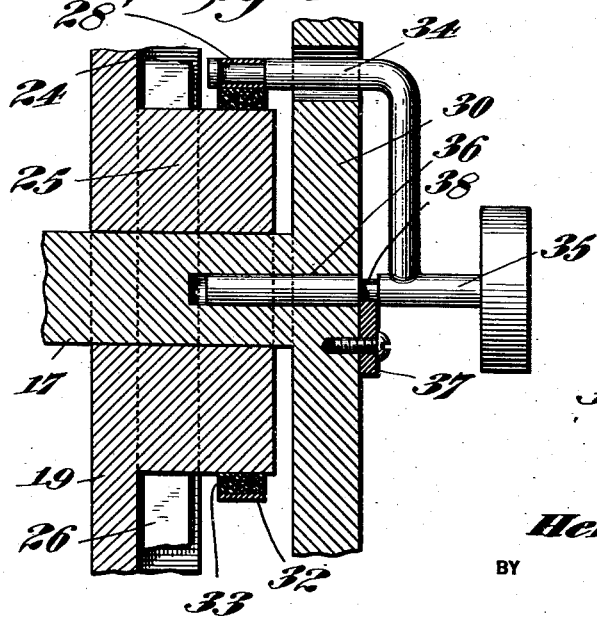
Fig. 3 is an enlarged section showing the operator member for controlling the operation of the servo mechanism; and, Fig. 4 is a reduced end elevation of the parts shown in Fig. 3.
Figure 4:
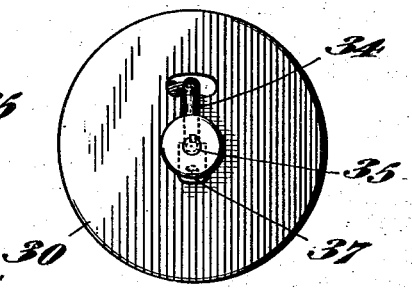

In operation, the shaft 10 rotates continuously in one direction and through the gearing rotates the drums 18 and 19 in opposite directions. When the operator member 35 is turned in the direction of rotation of the drum 19 the clutch band 32 will be tightened on the surface of the boss 25, which will cause the end 28' of lever 28 to move to the right, (Fig. 2), owing to the tangential pull of the band 32 thereon. Owing to the well known properties of band type clutches the force exerted on 28' will be several times that applied at the opposite end 34 of the band 32. The force acting on 28' will cause lever 28 to rock and the point 40 to move to the left, thus expanding the internal clutch band 26 and causing it to grip the drum 19. This will cause a force on the pin 31 in the direction of motion of drum 19, this force being several times greater than that applied at point 40 and therefore many times greater than the original force applied at 34. If the force on pin 31 is sufficient to overbalance that of the friction on disc 20, shaft 17 will turn in the direction of drum 19, whereas if it is less than this friction the shaft will turn in the direction of drum 18.

Referring now to the operation of my mechanism, the element 35 is regarded as the controlling element and this element may be controlled in any suitable manner, either directly or telemetrically. The effect of movement of the controlling element 35 in either direction relatively to the shaft 17 is to cause the latter to follow the relative motion of the element 35 in the same sense. When the frictional forces of the friction devices associated with the gears 18 and 19 are in equilibrium the shaft 17 does not move for the reason that the gears 18 and 19 are moving at equal speeds in opposite directions. If the pin 34 of the controlling element 35 is moved in a clockwise direction, this is immediately followed, after a slight relative angular movement of the pin 34 with respect to the shaft 17, by tightening of the band 32 and expansion of the band 26; and, as soon as the frictional force of the band 26 exceeds that due to the friction disc 21, the shaft 17 moves in the direction of movement of the pin 34. As long as the pin 34 moves, the shaft 17 follows that motion; and, if the pin 34 should come to a stop, the shaft 17 will, through the pins 29 and 31, automatically loosen the bands 32 and 26 until the frictional forces of the bands and of the disc 21 in connection with the gears 19 and 18, respectively, are in equilibrium, whereupon the shaft 17 comes to a stop. With the shaft 17 stationary and the controlling element 35 held, the force of friction of the bands 32 and 26 is maintained at an equilibrium value for the reason that the force of friction from the friction disc 21 is transmitted to the pins 31 and 29 tending to tighten the band 26, resulting in slippage of both gears with respect to their frictional devices and no movement of the shaft 17. If the pin 34 is moved in a counter-clockwise direction, the bands 32 and 26 are loosened in succession, and just as soon as the force of friction of the disc 21 preponderates over the force due to the bands 32 and 26, the shaft 17 moves in a counter-clockwise direction, this motion continuing and following the controlling element 35. When the controlling element 35 comes to a stop, the bands 32 and 26 are tightened until equilibrium is restored, whereupon the shaft 17 comes to a stop.

From the foregoing, it will be apparent that I have devised a mechanical follow up relay device which serves to clearly magnify a force applied to a controlling element and it also serves to cause the driven element to move angularly to the same extent as the controlling element is moved.

It is obvious that the frictional drive applied to 20 would be replaced by any other form of friction or any device such as a weight, spring or magnetic field to cause a relatively constant torque to act in the opposite direction to that furnished by the friction bands 32 and 26, such oppositely acting torque being either an integral part of the device, as here represented, or furnished by the apparatus to which shaft 17 is attached and which it is designed to actuate.

As is well known the tension (or compression) exerted in the band of a friction device is small at one end and increases in following the band around in the direction of movement of the friction drum, the rate of this increase being a function of the coefficient of friction of the surfaces. In a device of the kind described where a very large power amplification is desired and is obtained by a large angular arc of contact (nearly 2 revolutions in the design illustrated) the band stress varies greatly from one end of the band system to the other. At the power end the band must necessarily be of large cross section to carry the load, but if both bands were made throughout of this large cross section the stiffness and weight at the light power end would be so great that delicate control would be impossible. It is therefore arranged that the cross sectional size varies according to the stresses carried. This can be approximately achieved by using a heavy band on the large drum and a light one on the smaller drum or more nearly by regularly decreasing the width or thickness or both of the bands from one end to the other.

It will easily be seen that the above described mechanism provides a means, whereby a powerful torque may be transmitted and controlled at the expenditure of very little effort on the part of the operator member and furthermore a continuously operating source of power may be instantly made available and transmitted to a drive shaft without abruptness in either direction by the operation of a single device.

The servo mechanism which comprises the subject matter of the present invention may be put to many uses throughout the mechanical arts. It is, however, particularly useful in assisting in the manipulation of some large body or object, such as a gun or searchlight where the amount of work to be done is more than can be quickly and conveniently delivered manually. Power devices such as have been heretofore suggested have not been capable of being accurately controlled, and this has been a great objection to their employment. By means of the present invention, however, the object can not only be manipulated by power, but it can be manipulated with the greatest accuracy of movement, the delivery of power for the purpose of doing useful work being at all times under the close control of an operator or some automatic device. Also, the amount of power necessary to effect the controlled action of the servo mechanism is relatively quite small indeed.

Any suitable device may be employed to drive the drums in opposite directions at the desired speed. Electric motors have been found particularly useful in practice, but it will be realized that other prime movers may be adopted where conditions permit. The small size of the electric motor and the ease with which it may be attached commend it for use.

Assuming the drums to be rotating in opposite directions, the control element and drive shaft will yet remain stationary until the control element is manipulated. Rotation of this element in either direction will cause substantially simultaneous rotation of the shaft 17 in the same direction through the same angle and at the same speed. The control element may be continuously rotated in either direction if desired, and the drive shaft will be always in phase therewith. Or the control element may be oscillated, first in one direction and then in the other, and the drive shaft will always move at the same speed and through the same distance. The speed of rotation of the operator member and drive shaft are only limited by the speed of rotation of the drums, that is, these shafts may rotate at any speed, in either direction, from zero up to the speed of the drums. The control is extremely sensitive, so that a very slight torque exerted on the control element 35 will bring about synchronous movement of the drive shaft 17, although this shaft may be connected to some body or machine which opposes its movement with a very considerable force.

Various modifications obviously may be made in the details of the foregoing construction without departing from the spirit of the invention as embodied in the appended claims.

Having thus described my invention what I claim as new and desire to secure by Letters Patent is:

1. A motion transmitting device comprising a power shaft, a drive shaft, a pair of drum members revolubly mounted on the drive shaft and geared to the power shaft so as to rotate in opposite directions, a friction drive connection between each of said drums and the drive shaft, a tensioning device for each of the friction drives adapted to normally maintain the load on the contiguous faces of both friction drives in equilibrium and thereby maintain the drive shaft stationary, and an operator member engaging one of the tensioning devices so that a torque applied to move the operator member effects a corresponding movement of the drive shaft.

2. A motion transmitting device comprising a power shaft, a drive shaft, a pair of drum members geared to the power shaft so as to rotate in opposite directions, a friction drive means connecting each of said drum members to the drive shaft, a tensioning device for each of the friction drive means to normally establish an equilibrium whereby the drive shaft is maintained stationary, and an operator member engaging one of the friction drive means so that a torque given to said operator member will operate to destroy the equilibrium between the friction drives and cause the rotation of the drive member.

3. A motion transmitting device comprising a continuously running power shaft, a drive shaft, a pair of drum members geared to the power shaft so as to rotate in opposite directions, a friction drive means connecting each of said drum members to the drive shaft, a tensioning device for each of the friction drive means to normally establish an equilibrium whereby the drive shaft is maintained stationary, and an operator member engaging one of the friction drive means so that a torque given to said operator member will operate to destroy the equilibrium between the friction drives and cause the rotation of the drive member.

4. A motion transmitting device comprising a power shaft, a drive shaft, a pair of drum members geared to the power shaft so as to rotate in opposite directions, a friction clutch connecting each of said drum members to the drive shaft, a tensioning device for each of said friction clutches and normally maintained in equilibrium to hold said drive shaft stationary, and an operator member mounted to rotate relatively to the drive shaft so as to effect a change in the normal relationship of the tensioning devices and cause the drive shaft to follow the movement of the operator member.

5. A motion transmitting device comprising a power shaft, a drive shaft, a drum member driven by the power shaft, a friction band member adapted to engage the drum member and anchored at one end to the drive shaft, an operator member, a second friction band member adapted to engage the drum member and anchored at one end to the operator member, the friction surface of one band facing outwardly and the friction surface of the other facing inwardly, and a link member pivotally mounted on the drive shaft connecting the free ends of the friction members.

6. A motion transmitting device comprising a power shaft, a drive shaft, a drum member driven by the power shaft, a friction band nested within said drum and anchored at one end to the drive shaft, an operator member, a second friction band positioned contiguous with a cylindrical surface of said drum and pivoted at one end to said operator member, and a link member pivoted to the drive shaft and connecting the free ends of the friction bands, whereby a torque applied to the operator member will tighten the second band and will cause the power shaft to increase the friction between the first mentioned band and the drum member.

7. In a motion transmitting device the combination with a power shaft, of a drive shaft and a clutch device, said clutch device comprising a drum member operated by the power shaft, a plurality of friction bands adapted to said drum and connected together through the medium of link members, said bands engaging mutually facing friction surfaces of said drum, and an operator member mounted to rotate relatively to said drive shaft and engaging the end of one of said bands, whereby a torque applied to the operator member will operate the bands in series.

8. In a motion transmitting device the combination with a power shaft, of a drive shaft and a clutch device, said clutch device comprising a drum member operated by the power shaft, a plurality of friction bands adapted to engage oppositely facing friction surfaces of said drum and operatively connected together by lever mechanism, and an operator member mounted to rotate relatively to said drive shaft and engaging the end of one of said bands, whereby a torque applied to the operator member will operate the bands in series.

9. In a servo mechanism, in combination, a drive member movable in two directions, oppositely moving power driven members, a normally active frictional driving connection between each power driven member and the drive member whereby the drive member is constantly subjected to oppositely directed forces, and means for modifying the relative actions of said frictional connections whereby an unbalanced force may be exerted on said drive member to move the same in either direction.

10. In a servo mechanism, in combination, a drive member movable in two directions, oppositely moving power driven members, a normally active frictional driving connection between each power driven member and the drive member whereby the drive member is constantly subjected to oppositely directed forces, and means including an operator element movable in two directions for modifying the relative action of said friction connections to bring about an unbalanced force acting on the drive member to move the same, any movement of the operator element being followed without appreciable lag by proportional movement of the drive member.

11. In a servo mechanism, in combination, a drive member comprising a shaft rotatable in either direction, two oppositely rotatable power driven drums, a normally active frictional driving connection between each power driven member and the drive member whereby the drive member is constantly subjected to oppositely directed forces tending to rotate the same, and means including an operator element rotatable in either direction about an axis, for modifying the relative actions of said friction connections to bring about an unbalanced force acting in either direction on the drive member to rotate the same, any movement of the operator element being followed without appreciable lag by proportional movement of the drive member.

12. In a servo mechanism, in combination, a drive member movable in two directions, oppositely moving power driven members, a normally active frictional driving connection between said drive member and one of said power driven members for taking a uniform force from said power member and imparting it to said drive member, a second normally active frictional driving connection between the second of said power driven members and said drive member for taking a variable force from said power member and transmitting it to the drive member, and means for modifying the action of said second driving connection to cause the driving force developed thereby to balance or be greater or less than the force developed by the first mentioned driving connection.

13. In a servo mechanism, in combination, a drive shaft rotatable in either direction about an axis, oppositely rotating power driven drums, a normally active frictional driving connection between said drive shaft and one of said drums for taking a uniform force from said drum and imparting it to the drive shaft, a second normally active frictional driving connection between the second of said drums and said drive shaft for taking a variable force from said drum and transmitting it to the drive shaft, and means including a rotatable operator element for modifying the action of said second driving connection to cause the driving force developed thereby to balance or be greater or less than the force developed by the first mentioned driving connection, the rotatory movements of the operator element being followed without appreciable lag by proportional movements of the drive shaft.

14. The combination set forth in claim 13 in which means is provided to permit adjustment of the first mentioned frictional driving connection to increase or decrease the driving force developed thereby.

15. The combination set forth in claim 13 in which said last mentioned frictional driving connection includes a wrapping friction band having one end connected to the drive shaft and the other end to the operator element.

16. The combination set forth in claim 13 in which the second mentioned drum has two concentric cylindrical friction surfaces and in which the last mentioned frictional driving connection includes two wrapping friction bands in engagement with said surfaces respectively, the control end of the inner band being connected to the operator element, the power end of the outer band to the drive shaft, and the remaining band ends being connected by means of a lever pivotally supported upon the drive shaft.

17. The combination set forth in claim 13 in which the operator element is wholly supported by the drive shaft and is concentric therewith.

18. In a servo-mechanism, in combination, a drive member movable in two directions, and means for effecting the movement of said drive member in either direction including two sources of power, and an individual connection between each power source and said drive member, whereby the latter is constantly subjected to the action of opposed forces tending to move it in opposite directions, one of said connections comprising two friction members in constant engagement, one friction member being connected to the drive member so as to move therewith, and the other being constantly driven by power supplied by one of said power sources, and means for modifying the intensity of frictional engagement of said friction members whereby the force frictionally taken thereby from the associated power source and transmitted to said drive member may be made greater or less than, or equal to, the force transmitted to said drive member by the other connection.

19. In a servo-mechanism, in combination, a drive shaft rotatable in two directions about its axis, and means for effecting the rotation of said shaft in either direction including two sources of power and an individual connection between each such power source and said drive shaft whereby the latter is constantly subjected to the action of opposed forces tending to rotate it in opposite directions, one of said connections comprising two friction members in constant engagement, one friction member being a wrapping friction band having its power delivery end connected to the drive shaft, and the other being a drum constantly rotated by power supplied by one of said power sources and having a cylindrical friction face which the wrapping friction band engages, and means for manipulating the control end of said band whereby the intensity of frictional engagement of the band and drum may be modified so that the force transmitted by the friction band to the drive shaft may be made greater or less than, or equal to, the force transmitted to the drive member by the other power connection.

20. The combination set forth in claim 19 in which said last mentioned means comprises a shaft coaxial with the drive shaft and having an arm to which the control end of the wrapping friction band is connected.

21. In a servo-mechanism, in combination, a drive member movable in two directions, oppositely moving power driven members, a normally active frictional driving connection between each power driven member and the drive member whereby the drive member is constantly subjected to oppositely directed forces, means for modifying the relative actions of said frictional connections whereby an unbalanced force may be exerted on said drive member to move the same in either direction, and a device for adjusting the degree of normal frictional action of each driving connection.

22. In a servo-mechanism, in combination, a drive member movable in two directions, oppositely moving power driven members, a normally active frictional driving connection between the drive member and one of said power driven members for taking a uniform force from said power member and imparting it to said drive member, a second normally active frictional driving connection between the second of said power driven members and said drive member for taking a variable force from said power member and transmitting it to the drive member, means for adjusting the degree of normal action of said frictional driving connections, and means for modifying the normal relative actions of said frictional connections whereby an unbalanced force may be exerted on said drive member to move the same in either direction.

In testimony whereof I hereunto affix my signature this 28th day of January, 1925.

HENRY W. NIEMAN.

CERTIFICATE OF CORRECTION.

Patent No. 1,751,645.             Granted March 25, 1930, to

HENRY W. NIEMAN.

It is hereby certified that error appears in the printed specification of the above numbered patent requiring correction as follows: Page 3, line 20, for the word "would" read "could"; and that the said Letters Patent should be read with this correction therein that the same may conform to the record of the case in the Patent Office.

Signed and sealed this 13th day of May, A. D. 1930.

(Seal)                                               M. J. Moore,
Acting Commissioner of Patents.